Figure 1:
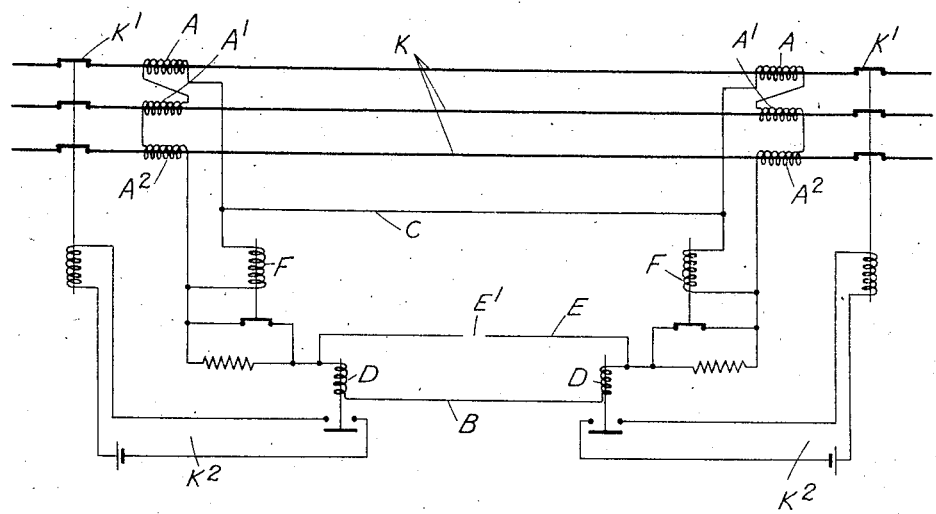

Patented Jan. 8, 1929.

1,698,337

UNITED STATES PATENT OFFICE.

BRUCE HAMER LEESON, OF TYNEMOUTH, AND REGINALD WILLIAM BILES, OF BALCOMBE, ENGLAND, ASSIGNORS TO A. REYROLLE & COMPANY LIMITED, OF HEBBURN-ON-TYNE, ENGLAND, A COMPANY OF GREAT BRITAIN.

ELECTRIC PROTECTIVE SYSTEM.

Application filed June 22, 1926, Serial No. 118,077, and in Great Britain July 7, 1925.

This invention relates to an electric protective system for a feeder or other conductor or set of conductors (hereinafter referred to for convenience as a "feeder") and has more particular reference to a balanced protective system in which the secondary windings of current transformers at the ends of the feeder are so connected into a two-core pilot circuit that there is normally a balance of E. M. F.'s in that circuit. Such a system is disclosed in the U. S. patent to Hunter and Beard No. 1,339,394, May 11, 1920.

It is well known that difficulties have arisen in various types of balanced protective systems (especially when the pilot wires are of great length) owing to the capacity currents flowing in the pilot circuit, and one known method of dealing with these difficulties is to provide each pilot core with a severed or open-circuited compensating conductor.

The present invention has for its object to provide a simple arrangement for compensating for the effects of capacity currents in a balanced protective system employing a two-core pilot circuit.

In the protective system according to this invention a compensating conductor, which is severed or open-circuited so that no current can flow through it from end to end, is provided for one only of the two cores of the pilot circuit and is so arranged relatively thereto that the relays or other tripping devices in the pilot circuit remain unaffected by capacity currents.

In one arrangement the compensating conductor is in the form of a sheath or shield surrounding the pilot core and its insulation and connected at each end between the protective current transformer secondary winding or windings and the operating coil of the adjacent tripping relay. Theoretically the most sensitive arrangement is for the sheath to be open-circuited at its mid-point, but in actual practice the open-circuiting point may be near one end of the pilot core without appreciably affecting the sensitiveness of the arrangement.

In an alternative arrangement the compensating conductor is in the form of a companion core disposed adjacent to the pilot core so that the two form a pair carrying equal amounts of capacity current. In this case a duplicate coil relay is employed at each end, the two coils being provided respectively in the companion core and in the pilot core. The compensating conductor should in this arrangement be open-circuited at or near the point giving equality of capacity current carried by the pilot core and its companion core.

In each arrangement the sensitiveness of each of the tripping relays may be varied in accordance with the conditions in the feeder by means of a relatively insensitive diverter relay.

The invention is especially applicable to a two-core pilot protective system for a three-phase feeder wherein complete protection is obtained against earth faults and interphase faults by providing at each end of the feeder a protective current transforming device so arranged that the three phases of the feeder have different inductive effects on the secondary circuit.

Figure 2:
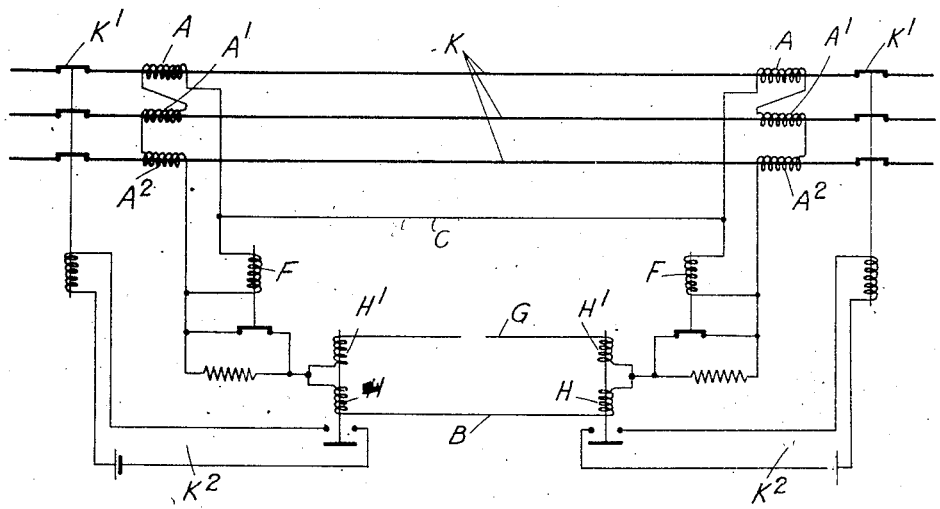

The invention may be carried into practice in various ways, but two alternative arrangements according thereto are diagrammatically illustrated by way of example respectively in Figures 1 and 2 of the accompanying drawings, the main protected three-phase feeder being omitted from the drawings for the sake of clearness.

In both these arrangements protective current transformers are provided at the ends of the feeder K and are arranged in one or other of the known manners to give the desired protection against earth faults and against interphase faults. In the actual arrangement illustrated three transformers are employed at each end of the feeder with their secondary windings A A¹ A² connected together in series with a two-core pilot circuit B C in such a manner that there is normally a balance of E. M. F.'s in the pilot circuit.

In the arrangement of Figure 1 one of the cores B of the pilot circuit contains at each end the operating coil D of a tripping relay which controls a tripping circuit K² for a circuit breaker K³ in the feeder K. Surrounding this core B is a conducting sheath E severed at an intermediate point E¹, which may be near one end. This sheath E is connected at each end between the operating coil D of the relay and the current transformer secondary windings A A¹ A². A diverter relay F of the break-contact type is connected across the secondary windings at each end, this relay acting in the known manner to control the sensitiveness of the adjacent tripping relay D.

In this arrangement the capacity currents are free to flow in the unsheathed pilot core C which does not contain the tripping relays D and also in the compensating sheath E, but no capacity current flows through the relay coils D.

In the arrangement of Figure 2 the compensating sheath of Figure 1 is replaced by a companion core G which is arranged by the side of the pilot core B so as to carry the same capacity current as the core B and is open-circuited at or near the point giving such equality in the capacity currents carried by the two companion cores. In this instance each of the tripping relays has two differentially arranged operating coils H H¹ connected respectively into the pilot core B and into the companion core G. In other respects the arrangement is identical with that of Figure 1.

In this arrangement the capacity currents flow freely in the second pilot core C and also flow in equal amount through the first pilot core B and its companion core G. Owing to the equality of capacity current flowing through the cores B and G, the two coils H H¹ of the tripping relay also carry equal currents and the relay therefore remains unaffected by the capacity currents.

It will be understood that modifications may be made in these arrangements without departing from the scope of the invention.

What we claim as our invention and desire to secure by Letters Patent is:—

1. A balanced electric protective system, including in combination a two-core pilot circuit, protective current transformers disposed at the ends of the protected circuit and having their secondaries so connected in the pilot circuit that there is normally a balance of E. M. F.'s therein, tripping devices associated with the pilot circuit and acting when operated to cut out the protected circuit at both ends, and means associated with one only of the two pilot cores whereby the tripping devices remain unaffected by capacity currents flowing in the pilot circuit.

2. A balanced electric protective system, including in combination a two-core pilot circuit, protective current transformers disposed at the ends of the protected circuit and having their secondaries so connected in the pilot circuit that there is normally a balance of E. M. F.'s therein, relays connected in the pilot circuit and acting when operated to cut out the protected circuit at both ends, and a compensating conductor which is associated with one only of the two pilot cores and is severed or open-circuited so that no current can flow through it from end to end, the arrangement being such that the relays remain unaffected by capacity currents flowing in the pilot circuit.

3. A balanced electric protective system, including in combination a two-core pilot circuit, protective current transformers disposed at the ends of the protected circuit and having their secondaries so connected in the pilot circuit that there is normally a balance of E. M. F.'s therein, tripping devices associated with the pilot circuit and acting when operated to cut out the protected circuit at both ends, and a compensating conductor which is associated with one only of the two pilot cores and is in the form of a severed or open-circuited companion core disposed adjacent to such pilot core, the arrangement being such that the tripping devices remain unaffected by capacity currents flowing in the pilot circuit.

4. A balanced electric protective system, including in combination a two-core pilot circuit, protective current transformers disposed at the ends of the protected circuit and having their secondaries so connected in the pilot circuit that there is normally a balance of E. M. F.'s therein, a compensating conductor which is associated with one only of the two pilot cores and is in the form of a severed or open-circuited companion core disposed adjacent to such pilot core, and a relay at each end of the pilot circuit acting when operated to cut out the protected circuit at both ends, each relay having two operating coils one of which is connected in the pilot core whilst the other is connected in the companion core.

5. A balanced electric protective system for a three-phase feeder, including in combination a group of protective current transformers at each end of the protected circuit having their secondaries so connected in series with one another that the three phases of the feeder have different inductive effects on the secondary circuit, a two-core pilot circuit into which the transformer secondaries are so connected that there is normally a balance of E. M. F.'s in that circuit, tripping devices associated with the pilot circuit and acting when operated to cut out the protected circuit at both ends, and means associated with one only of the two pilot cores whereby the tripping devices remain unaffected by capacity currents flowing in the pilot circuit.

6. A balanced electric protective system for a three-phase feeder, including in combination a group of protective current transformers at each end of the protected circuit having their secondaries so connected in series with one another that the three phases of the feeder have different inductive effects on the secondary circuit, a two-core pilot circuit into which the transformer secondaries are so connected that there is normally a balance of E. M. F.'s in that circuit, relays connected in the pilot circuit and acting when operated to cut out the protected circuit at both ends, and a compensating conductor which is associated with one only of the pilot cores and is severed or open-circuited so that no current can flow through it from end to end, the arrangement being such that the relays remain unaffected by capacity currents flowing in the pilot circuit.

7. A balanced electric protective system for a three-phase feeder, including in combination a group of protective current transformers at each end of the protected circuit having their secondaries so connected in series with one another that the three phases of the feeder have different inductive effects on the secondary circuit, a two-core pilot circuit into which the transformer secondaries are so connected that there is normally a balance of E. M. F.'s in that circuit, a compensating conductor which is associated with one only of the two pilot cores and is in the form of a severed or open-circuited companion core disposed adjacent to such pilot core, and a relay at each end of the pilot circuit acting when operated to cut out the protected circuit at both ends, each relay having two operating coils one of which is connected in the pilot core whilst the other is connected in the companion core.

In testimony whereof we have signed our names to this specification.

BRUCE HAMER LEESON.
REGINALD WILLIAM BILES.